United States Patent
Aruga et al.

(10) Patent No.: US 10,520,851 B2
(45) Date of Patent: Dec. 31, 2019

(54) LIGHT SCANNING APPARATUS AND IMAGE FORMING APPARATUS

(71) Applicant: CANON KABUSHIKI KAISHA, Tokyo (JP)

(72) Inventors: Daisuke Aruga, Abiko (JP); Yasuaki Otoguro, Abiko (JP); Yuta Okada, Moriya (JP); Yoshitaka Otsubo, Tokyo (JP); Yuichiro Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/263,145

(22) Filed: Jan. 31, 2019

(65) Prior Publication Data
US 2019/0243277 A1 Aug. 8, 2019

(30) Foreign Application Priority Data
Feb. 8, 2018 (JP) ................................. 2018-020697

(51) Int. Cl.
| G03G 15/043 | (2006.01) |
| G02B 26/12 | (2006.01) |
| G03G 15/04 | (2006.01) |
| G03G 21/16 | (2006.01) |

(52) U.S. Cl.
CPC ......... G03G 15/0435 (2013.01); G02B 26/12 (2013.01); G03G 15/04072 (2013.01); *G03G 21/1666* (2013.01)

(58) Field of Classification Search
CPC ................... G03G 15/0435; G03G 15/047072
See application file for complete search history.

(56) References Cited

U.S. PATENT DOCUMENTS

| 7,522,326 B1 | 4/2009 | Otoguro ........................ 347/256 |
| 7,684,099 B2 | 3/2010 | Otoguro ..................... 359/216.1 |
| 8,810,622 B2 | 8/2014 | Mamiya et al. .............. 347/242 |
| 8,917,305 B2 | 12/2014 | Nakahata et al. ............ 347/244 |
| 8,947,478 B2 | 2/2015 | Ishidate et al. ............... 347/137 |
| 9,086,645 B2 | 7/2015 | Otoguro et al. ... G03G 15/0435 |
| 9,195,063 B2 | 11/2015 | Ishidate et al. ...... G02B 26/125 |
| 9,316,992 B2 | 4/2016 | Ishidate et al. ........ G03G 15/80 |
| 9,400,444 B2 | 7/2016 | Sato et al. ........... G03G 15/043 |

(Continued)

FOREIGN PATENT DOCUMENTS

| JP | 2000-193902 | 7/2000 |
| JP | 2014-052541 | 3/2014 |

*Primary Examiner* — Gregory H Curran
(74) *Attorney, Agent, or Firm* — Venable LLP

(57) ABSTRACT

A light scanning apparatus including: a light source; a rotary polygon mirror configured to deflect a light beam emitted from the light source; an optical component of an incident optical system configured to introduce the light beam to the rotary polygon mirror; an optical box configured to contain the rotary polygon mirror and the optical component; and a supporting base installed between the light source and the rotary polygon mirror and configured to support the optical component, wherein the supporting base includes: a first dust-proof member configured to seal a boundary portion between the optical box and the supporting base; and a protrusion configured to enter an opening, which is formed in a side wall of the optical box from the inside of the optical box in a state in which the supporting base is mounted to the optical box, the light source being fixed to the opening.

14 Claims, 11 Drawing Sheets

(56) References Cited

U.S. PATENT DOCUMENTS

| | | | |
|---|---|---|---|
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,906,663 B2 | 2/2018 | Otsubo | H04N 1/00551 |
| 9,927,732 B2 | 3/2018 | Otsubo | G03G 15/04036 |
| 10,061,119 B2 | 8/2018 | Ogura et al. | G02B 7/181 |
| 10,185,119 B2 | 1/2019 | Ishidate et al. | G02B 7/1821 |
| 10,191,403 B2 | 1/2019 | Omura et al. | G03G 15/0189 |
| 2010/0033790 A1* | 2/2010 | Obara | B41J 2/473 359/204.1 |
| 2012/0269551 A1* | 10/2012 | Iwai | G03G 15/04045 399/177 |
| 2012/0300007 A1* | 11/2012 | Fujii | B41J 2/471 347/118 |
| 2017/0010558 A1 | 1/2017 | Ishidate et al. | B41J 2/47 |
| 2017/0064108 A1 | 3/2017 | Mamiya et al. | H04N 1/00525 |
| 2018/0231768 A1 | 8/2018 | Nakahata et al. | G02B 26/124 |
| 2018/0231769 A1 | 8/2018 | Aruga et al. | G02B 26/124 |
| 2018/0231770 A1 | 8/2018 | Okada et al. | G02B 26/125 |
| 2018/0231913 A1 | 8/2018 | Ishidate et al. | G03G 15/04036 |
| 2018/0231914 A1 | 8/2018 | Imai et al. | G02B 26/12 |
| 2018/0231915 A1 | 8/2018 | Otoguro et al. | G03G 15/04072 |
| 2018/0234565 A1 | 8/2018 | Imai | G02B 7/182 |
| 2018/0234573 A1 | 8/2018 | Okada et al. | H04N 1/0283 |
| 2018/0234575 A1 | 8/2018 | Namba et al. | H04N 1/02815 |
| 2018/0259874 A1 | 9/2018 | Okada et al. | G03G 15/0435 |

* cited by examiner

LIGHT SCANNING APPARATUS AND IMAGE FORMING APPARATUS

BACKGROUND OF THE INVENTION

Field of the Invention

The present invention relates to a light scanning apparatus to be used for an image forming apparatus such as a copying machine, a printer, a facsimile machine, or a multifunction peripheral thereof, and to an image forming apparatus.

Description of the Related Art

As a light scanning apparatus to be used for an electrophotographic image forming apparatus, there has been known a light scanning apparatus having the following configuration. Specifically, there has been known a light scanning apparatus configured to form a latent image on a surface to be scanned by deflecting a light beam emitted from a light source with a deflector, condensing the light beam toward the surface to be scanned with a scanning imaging optical system to form beam spots on the surface to be scanned, and scanning the surface to be scanned with the beam spots. Inside the light scanning apparatus, there is provided the deflector (for example, a rotary polygon mirror) configured to deflect a laser beam emitted from a semiconductor laser. The deflector rotates at high speed to deflect the laser beam described above. Then, the laser beam having been deflected irradiates a photosensitive member. In this manner, the semiconductor laser repeatedly turns on and off to cause the photosensitive member to be irradiated with the laser beam, thereby forming a desired electrostatic latent image. With regard to image forming apparatus which are available in recent years, products which are capable of forming an image with a high resolution of 1,200 dpi or 2,400 dpi are mainly provided, and a product which is capable of providing a larger number of output per unit time is demanded. Therefore, along with the increase in rotation speed of the deflector, vibration energy generated by the deflector itself increases. As a result, an optical box being a housing of the light scanning apparatus and optical components installed inside the optical box are vibrated, which may result in so-called "beam oscillation" in which the laser beam oscillates in accordance with a rotation cycle of the deflector. Consequently, positions of the electrostatic latent image to be formed on the photosensitive member may deviate in a cyclic manner, with the result that an uneven pitch occurs in the image to be formed.

Among products which are included in a product zone with capability to form an image of a high resolution and provide a larger number of output, some products include a deflector which operates at high rotation speed exceeding 45,000 rpm. When such a device that operates at high speed is to be used, in order to suppress the vibration and increase the stiffness of the light scanning apparatus, in some cases, measures are taken by adopting a metal material, for example, aluminum to the optical box of the light scanning apparatus. However, when the optical box made of the metal material is adopted, a surface of the optical box has a reflectance higher than that given in a case in which, for example, an optical box made of a resin material is used. Therefore, in some cases, a laser beam which is not to be used for image formation is reflected on the surface of the optical box, with the result that the surface of the photosensitive member is irradiated with light which is not intended (hereinafter referred to as "stray light"). Thus, in some cases, the density of the image becomes uneven, which may cause image defects. Moreover, in order to produce the optical box made of the metal material, die-cast molding is adopted in some cases. An incident optical component is installed between the light source and the deflector, and high-precision processing is required for a bearing surface of a supporting portion for the incident optical component. However, the die-cast molding cannot sufficiently satisfy the required precision. Therefore, secondary processing by cutting is required. However, a processed surface obtained by cutting has a high reflectance, which may cause stray light having a high intensity.

In order to solve such problems, there has been given a method of manufacturing an incident optical system supporting base, which is configured to hold the incident optical component, with a resin material having a low reflectance and mounting the incident optical system supporting base to the optical box. In this case, the optical box and the incident optical system supporting base are formed as separate members. Thus, a gap is defined at a boundary portion therebetween. Therefore, there is a fear in that dust-proof performance of the light scanning apparatus is degraded. In recent years, when the dust-proof performance of the light scanning apparatus is degraded, contaminated air may enter the light scanning apparatus to cause contamination on the surface of the deflector. As a result, in some cases, the reflectance of the deflector is degraded, and the image density becomes uneven. Therefore, it is required to prevent degradation in dust-proof performance of the light scanning apparatus. In view of the foregoing, as a method of improving the dust-proof performance of an incident portion, for example, in Japanese Patent Application Laid-Open No. 2014-52541, there has been proposed a method of preventing contamination of the deflector by covering a periphery of the deflector with a flow-adjustment member. Moreover, for example, in Japanese Patent Application Laid-Open No. 2000-193902, there has been proposed a method of tightly closing the deflector through abutment of the optical box, a cover of the optical box, and a cylindrical lens against one another, to thereby secure the dust-proof performance.

However, the configuration of closing the gap defined between the optical box and the incident optical system supporting base with an elastic member has the following problem. With this configuration, there is a fear in that the elastic member is flipped over at the time of installing the incident optical system supporting base in the optical box. When the elastic member is flipped over, the dust-proof performance of the light scanning apparatus is degraded.

SUMMARY OF THE INVENTION

In order to solve the problems described above, according to one embodiment of the present invention, there is provided a light scanning apparatus comprising:

a light source configured to emit a light beam;

a rotary polygon mirror configured to deflect the light beam emitted from the light source;

an optical component of an incident optical system configured to introduce the light beam, which has been emitted from the light source, to the rotary polygon mirror;

an optical box, to which the light source is mounted, configured to contain the rotary polygon mirror and the optical component in an inside of the optical box; and a supporting base, which is installed on an optical path of the light beam between the light source and the rotary polygon mirror, and is configured to support the optical component, wherein the supporting base includes:
a first dust-proof member configured to seal a boundary portion between the optical box and the supporting base to dustproof the inside of the optical box; and
a protrusion configured to enter an opening, which is formed in a side wall of the optical box from the inside of the optical box in a state in which the supporting base is mounted to the optical box, the light source being fixed to the opening.

An image forming apparatus comprising:
an image forming unit configured to form an image on a sheet; and
the light scanning apparatus.

Further features of the present invention will become apparent from the following description of exemplary embodiments with reference to the attached drawings.

DESCRIPTION OF THE EMBODIMENTS

Now, an embodiment of the present invention is described in detail with reference to the drawings. In the following description, a rotation axis direction of a rotary polygon mirror 42 of a deflector 43, which is to be described later, is defined as a Z-axis direction. A main scanning direction being a scanning direction of a light beam or a longitudinal direction of optical components of an exit optical system is defined as a Y-axis direction. A sub-scanning direction being a direction orthogonal to the Y axis and the Z axis is defined as an X-axis direction.

Embodiment

[Configuration of Image Forming Apparatus]

Figure 1:
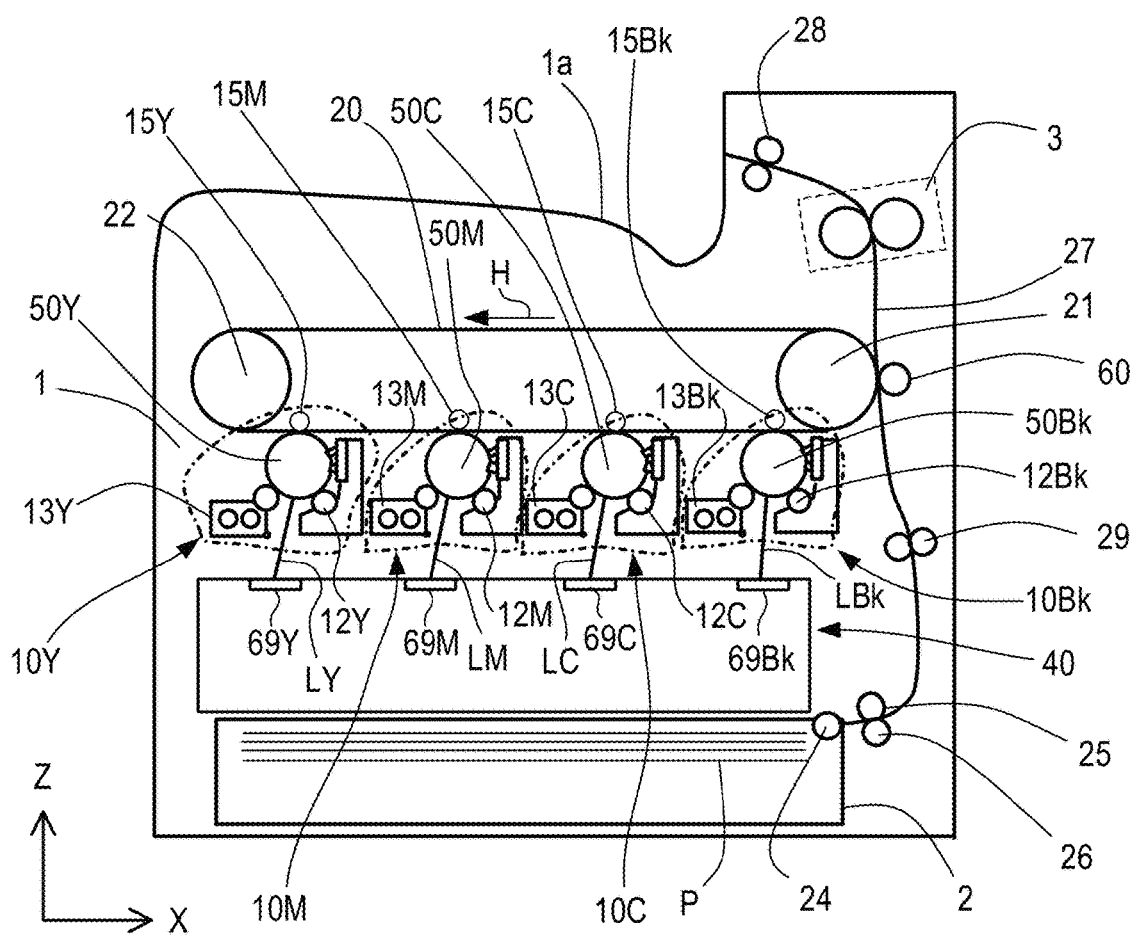
FIG. 1 is a sectional view for illustrating a configuration of an image forming apparatus according to an embodiment of the present invention.

A configuration of an image forming apparatus according to an embodiment of the present invention is described. FIG. 1 is a schematic configuration view for illustrating an overall configuration of a tandem type color laser beam printer in this embodiment. The laser beam printer (hereinafter simply referred to as "printer") includes four image forming engines 10Y, 10M, 10C, and 10Bk (indicated by the one-dot chain lines) configured to form toner images for respective colors of yellow (Y), magenta (M), cyan (C), and black (Bk). Further, the printer includes an intermediate transfer belt 20 onto which a toner image is transferred from each of the image forming engines 10Y, 10M, 10C, and 10Bk. Then, the toner images multiply transferred onto the intermediate transfer belt 20 are transferred onto a recording sheet (also referred to as "sheet") P being a recording medium to form a full-color image. Unless otherwise necessary, the reference symbols Y, M, C, and Bk indicating the respective colors are hereinafter omitted.

The intermediate transfer belt 20 is formed into an endless shape and is carried over a pair of belt conveyance rollers 21 and 22 so that a toner image formed by each image forming engine 10 is transferred while the intermediate transfer belt 20 is rotating in a direction indicated by the arrow H. Further, a secondary transfer roller 60 is provided at a position opposed to one belt conveyance roller 21 across the intermediate transfer belt 20. The recording sheet P is inserted between the secondary transfer roller 60 and the intermediate transfer belt 20 which are held in press-contact with each other, with the result that a toner image is transferred onto the recording sheet P from the intermediate transfer belt 20. The four image forming engines 10Y, 10M, 10C, and 10Bk described above are arranged in parallel on a lower side of the intermediate transfer belt 20 so that a toner image formed in accordance with image information of each color is transferred onto the intermediate transfer belt 20 (hereinafter referred to as "primary transfer"). The four image forming engines 10 are arranged in the following order: the image forming engine 10Y for yellow, the image forming engine 10M for magenta, the image forming engine 10C for cyan, and the image forming engine 10Bk for black along a rotation direction (direction indicated by the arrow H) of the intermediate transfer belt 20.

Further, a light scanning apparatus 40 is provided below the image forming engines 10. The light scanning apparatus 40 is configured to expose a photosensitive drum 50, which is a member to be scanned provided in each image forming engine 10, to light in accordance with image information. The light scanning apparatus 40 is shared by all the image forming engines 10Y, 10M, 10C, and 10Bk and includes four semiconductor lasers (not shown) configured to emit a light beam modulated in accordance with image information of each color. Detailed illustration and description of the light scanning apparatus 40 are omitted in FIG. 1 and are given later with reference to FIG. 2.

Further, each image forming engine 10 includes the photosensitive drum 50 and a charging roller 12 configured to charge the photosensitive drum 50 to a uniform background potential. Further, each image forming engine 10 includes a developing device 13 configured to form a toner image by developing an electrostatic latent image formed on the photosensitive drum 50 (member to be scanned) by exposure to the light beam. The developing device 13 forms a toner image in accordance with image information of each color on the photosensitive drum 50. A primary transfer roller 15 is provided at a position opposed to the photosensitive drum 50 of each image forming engine 10 across the intermediate transfer belt 20. When a predetermined transfer voltage is applied to the primary transfer roller 15, a toner image on the photosensitive drum 50 is transferred onto the intermediate transfer belt 20.

Meanwhile, the recording sheet P is supplied from a feed cassette 2 contained in a lower portion of a printer housing 1 to an inner portion of the printer, specifically a secondary transfer position at which the intermediate transfer belt 20 and the secondary transfer roller 60 are held in abutment against each other. In an upper portion of the feed cassette 2, a pickup roller 24 configured to pull out the recording sheet P received in the feed cassette 2 and a feed roller 25 are arranged in parallel. Further, a retard roller 26 configured to prevent overlap feeding of the recording sheet P is provided at a position opposed to the feed roller 25. A conveyance path 27 of the recording sheet P inside the printer is provided substantially vertically along a right side surface of the printer housing 1. The recording sheet P pulled out from the feed cassette 2 positioned in a bottom of the printer housing 1 ascends through the conveyance path 27 and is sent to registration rollers 29 configured to control an entry timing of the recording sheet P with respect to the secondary transfer position. After that, a toner image is transferred onto the recording sheet P at the secondary transfer position, and then the recording sheet P is sent to a fixing device 3 (indicated by the broken lines) provided on a downstream side in the conveyance direction. Then, the recording sheet P having the toner image fixed thereon by the fixing device 3 is delivered by delivery rollers 28 to a delivery tray 1a provided in an upper portion of the printer housing 1. When a full-color image is formed by the color laser beam printer configured as described above, first, the light scanning apparatus 40 exposes the photosensitive drum 50 of each image forming engine 10 to light at a predetermined timing in accordance with image information of each color.

[Configuration of Light Scanning Apparatus]

Figure 2:
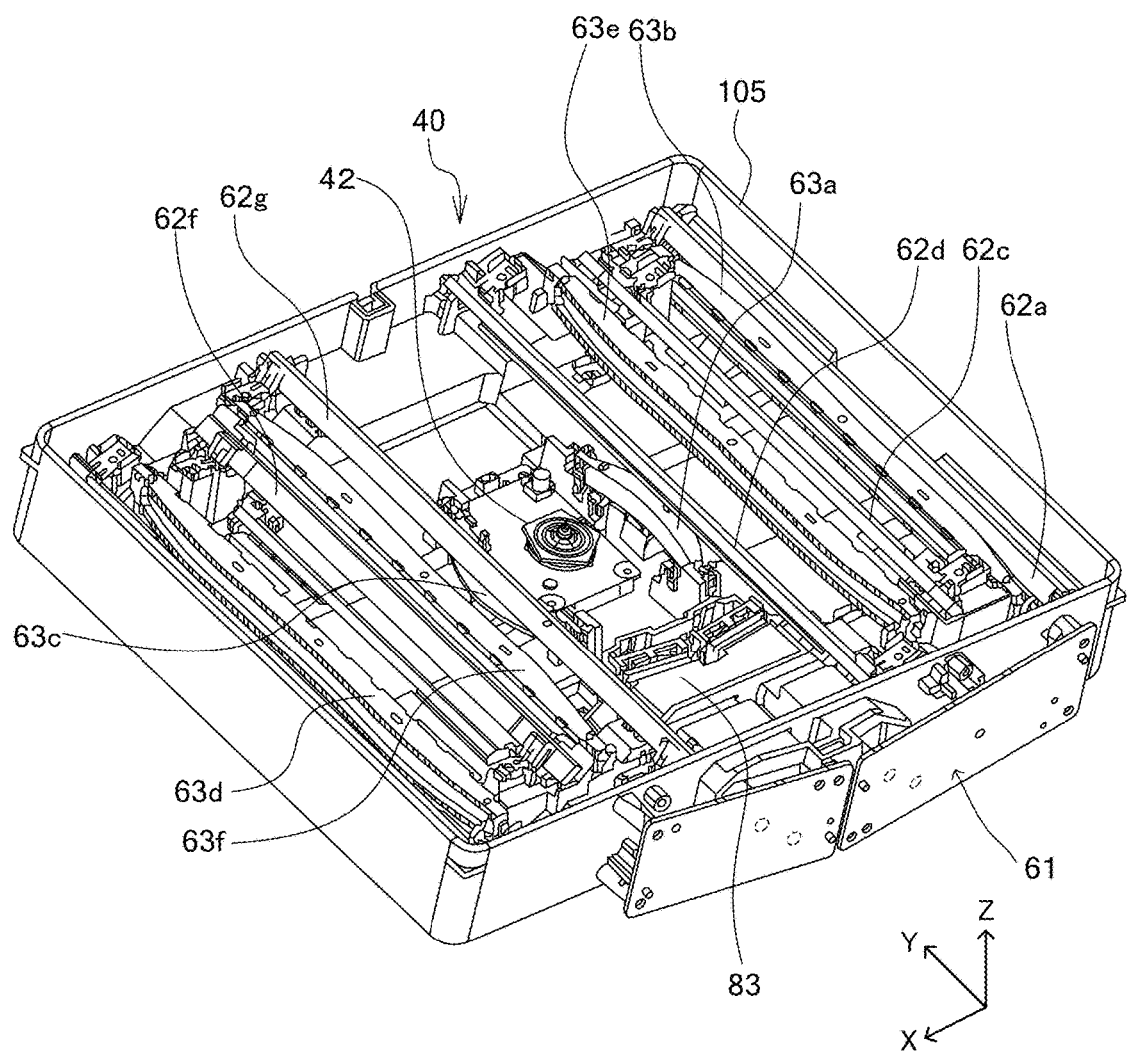
FIG. 2 is a perspective view for illustrating a configuration of a light scanning apparatus according to the embodiment.
Figure 4:
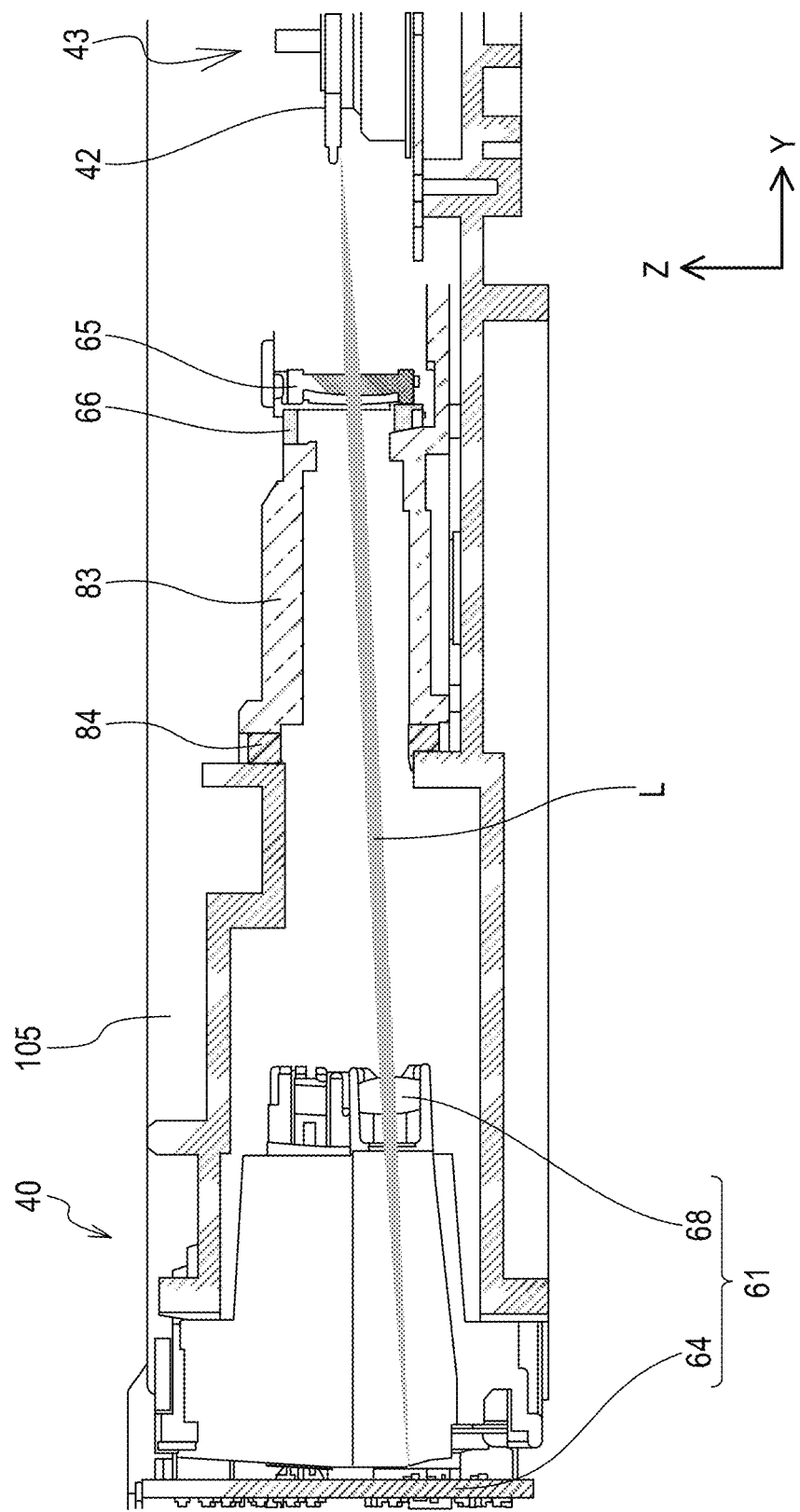
FIG. 4 is a sectional view for illustrating the configuration of the light scanning apparatus according to the embodiment.
Figure 5:
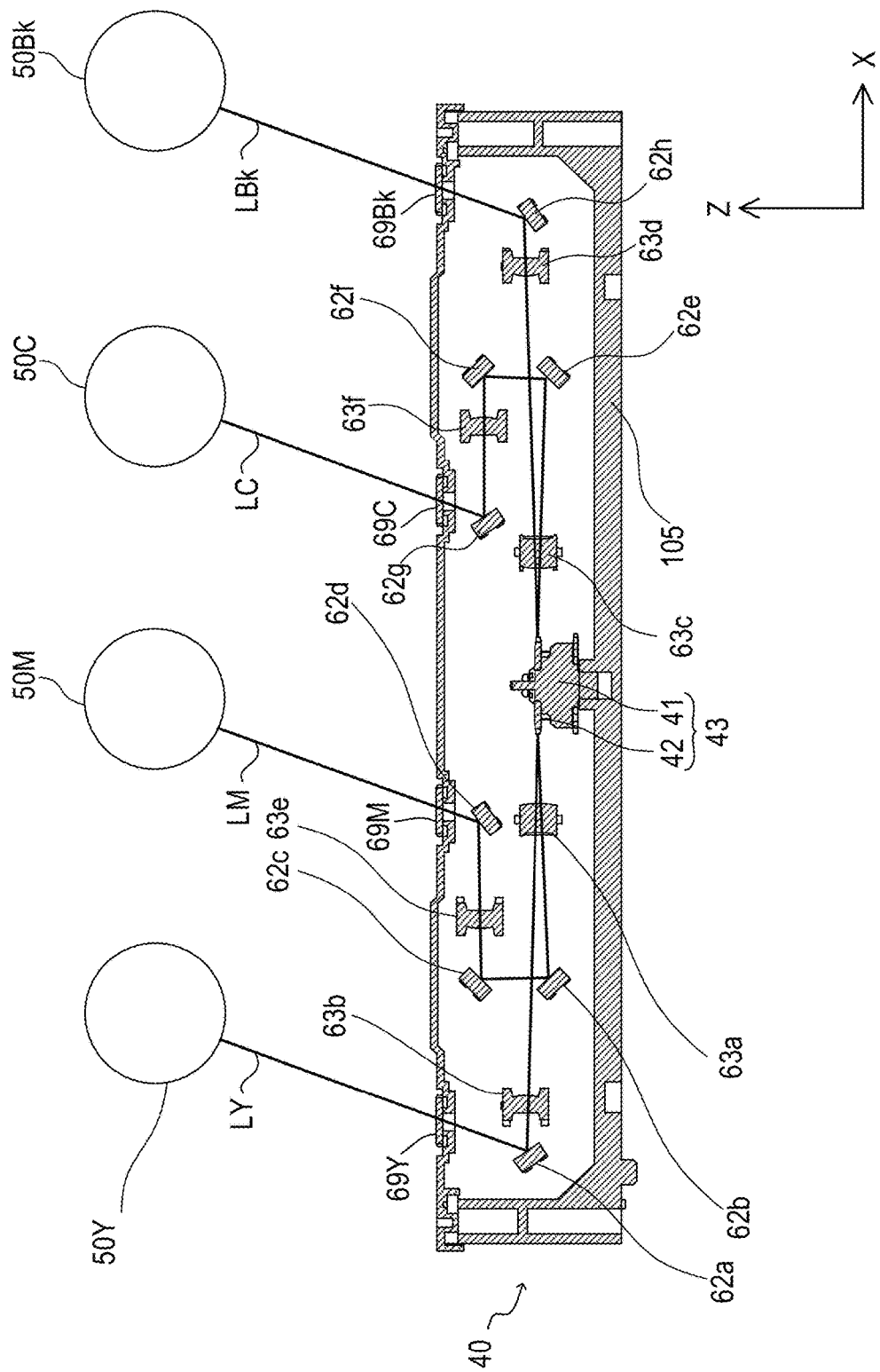
FIG. 5 is a sectional view for illustrating the configuration of the light scanning apparatus according to the embodiment.

FIG. 2 is a perspective view for illustrating a configuration of the light scanning apparatus 40 according to this embodiment. Moreover, FIG. 4 is a sectional view for illustrating the light scanning apparatus 40, and is an illustration of an optical path on which a laser beam emitted from the light source proceeds to reach a rotary polygon mirror. Further, FIG. 5 is a sectional view for illustrating the light scanning apparatus 40, and is an illustration of optical paths on which laser beams deflected by the rotary polygon mirror are guided to the photosensitive drums.

In FIG. 2, an optical box 105 being a housing of the light scanning apparatus 40 includes a bottom surface (bottom) and an outer wall (side wall, which is hereinafter also referred to as "outer peripheral portion"). The bottom surface is a surface which is parallel to an XY plane. The outer wall is provided upright on the bottom surface, and is substantially parallel to the Z-axis direction. Light source units 61 are mounted to the outer peripheral portion (side wall) of the optical box 105 of the light scanning apparatus 40. The light source units 61 each include laser beam emitting sources (light sources) configured to emit light beams (laser beams). Inside the light scanning apparatus 40, there is provided an incident optical system supporting base 83 on which cylindrical lenses 65 described later (see FIG. 4) are mounted. The incident optical system supporting base 83 is configured to introduce the light beams emitted from the light source units 61 to the rotary polygon mirror 42. Moreover, inside the light scanning apparatus 40, there are provided, for example, the rotary polygon mirror 42, optical lenses 63 (63a to 63f), and reflection mirrors 62 (62a to 62h), which are integrally installed to the optical box 105. The rotary polygon mirror 42 is configured to reflect and deflect the light beams. The optical lenses 63 (63a to 63f) and the reflection mirrors 62 (62a to 62h) form an exit optical system which is configured to guide the light beams onto the photosensitive drums 50 and form images thereon. The reflection mirrors 62 are fixed to the optical box 105 through use of fixing springs at both end portions in the longitudinal direction (Y-axis direction). The light beams having been deflected by the rotary polygon mirror 42 pass through the optical lenses 63a and 63c and thereafter are guided to the optical lenses 63b, 63d, 63e, and 63f. The light beams having passed through the optical lenses 63 are reflected by the reflection mirrors 62 at least once and then are guided to the photosensitive drums 50 to form images thereon. The optical box 105 is formed by die-cast molding with a metal material such as aluminum or magnesium. Moreover, the incident optical system supporting base 83 is formed with a resin material such as PC-ABS or PPE-PS, and it is preferred that the incident optical system supporting base 83 be made of a material having a reflectance lower than that of the optical box 105 for the purpose of preventing the stray light. For example, when the incident optical system supporting base 83 can be formed so as to have a surface reflectance lower than that of the optical box 105 by roughening the surface through, for example, blasting, the incident optical system supporting base 83 may be formed of a metal material. In FIG. 2, for convenience of description, a cover configured to tightly close an opening portion formed at an upper portion of the optical box 105 is omitted.

As described above, there is a case in which the optical components provided inside the light scanning apparatus 40 are vibrated by vibration energy generated through high-speed rotation of the deflector 43 (see FIG. 5 described later) or vibration energy generated from a movable portion for operating a printer including the light scanning apparatus 40. That is, there is a case in which the optical components such as the optical lenses 63 (63a to 63f) and the reflection mirrors 62 (62a to 62h) provided inside the light scanning apparatus 40 are vibrated. Therefore, in order to prevent the vibration of the optical components, the optical box 105 is formed with a metal material including aluminum or magnesium so as to increase stiffness of the optical box 105 and suppress generation of vibration of the optical box 105. The vibration of the optical components such as the optical lenses 63 and the reflection mirrors 62 causes cyclical positional fluctuation of the laser beams that pass through the optical lenses 63 and the laser beams reflected on the reflection mirrors 62. As a result, unevenness or streaks in a stripe pattern are formed in an output image of the recording sheet P. As described above, in recent years, as the rotation speed of the deflector 43 of the light scanning apparatus 40 in the image forming apparatus increases, the vibration energy which acts on members provided inside the light scanning apparatus 40 increases. Therefore, there is a need for countermeasure against the vibration by forming the optical box of the light scanning apparatus 40 as a metal housing.

When the optical box formed of a metal material is to be manufactured, a method of pouring a molten metal material into a die, such as die-cast molding, is adopted. The molten metal material has low flowability. Thus, with the die-cast molding, it is more difficult to form a complicated shape or small recesses and protrusions as compared to resin molding. As one of problems of the light scanning apparatus 40, there are given occurrence of unevenness in image density and formation of streaks in a formed image due to the presence of the stray light described above. As described above, such problem occurs when a laser beam which is not relevant (not related) to image formation is reflected on, for example, a wall surface of the optical box 105 and is unintentionally guided to the photosensitive drum being a surface to be scanned.

Typically, an image forming apparatus of a low-speed type or a middle-speed type adopts resin molding using a resin material to form the optical box 105 into a complicated shape, and the stray light is prevented from being guided to the surfaces of the photosensitive drums. The resin molding using the resin material has high moldability, and hence such measure can be taken. However, with regard to the optical box 105 using the metal material, it is difficult to take a measure similar to that for the resin molding. Therefore, when the problem described above occurs due to the presence of the stray light, the following measures are taken in many cases. Specifically, a light blocking wall which is a large-scale separate component for blocking scattered stray light is installed in addition to the optical box 105 configured to support the optical components, or a reflection suppressing sheet is bonded to a surface on which the laser beam is reflected. However, in many cases, such a measure may cause limitation on a degree of freedom in design, for example, limitation on arrangement of another component due to installation of the separate component (light blocking wall), or sufficient blocking cannot be performed due to priority on the arrangement of another component. Thus, in many cases, further measure is required.

[Reflectance of Resin Housing, Metal Housing, and Surface of Metal Housing Subjected to Cutting]

With regard to the resin housing molded with the resin material, the metal housing molded with the metal material, and a cut part obtained by subjecting the metal housing to cutting, measurement of differences in reflectance with respect to the laser beam was conducted through use of a red laser beam having a constant amount of emission light. The actual measurement was conducted under the following measurement environment. A red laser beam having a constant amount of emission light is emitted from a semiconductor laser manufactured by Sony corporation, and each of the resin housing, the metal housing, and the cut part obtained by subjecting the metal housing to cutting, which are measured objects, is irradiated with a laser beam collimated by a collimator lens. Then, the amount of reflection light from a surface of the measured object is measured through use of an optical power meter (ADCMT8230 series (infrared light adaptable type)) manufactured by ADC Corporation. At the time of measurement, measurement conditions of the optical power meter are set so as to have a wavelength center value of a laser specification. Moreover, a distance and an angle between a measured object and the laser and between the measured object and the optical power meter are set so as to be the same at the time of measuring the resin housing and at the time of measuring the metal housing.

Figure 3:
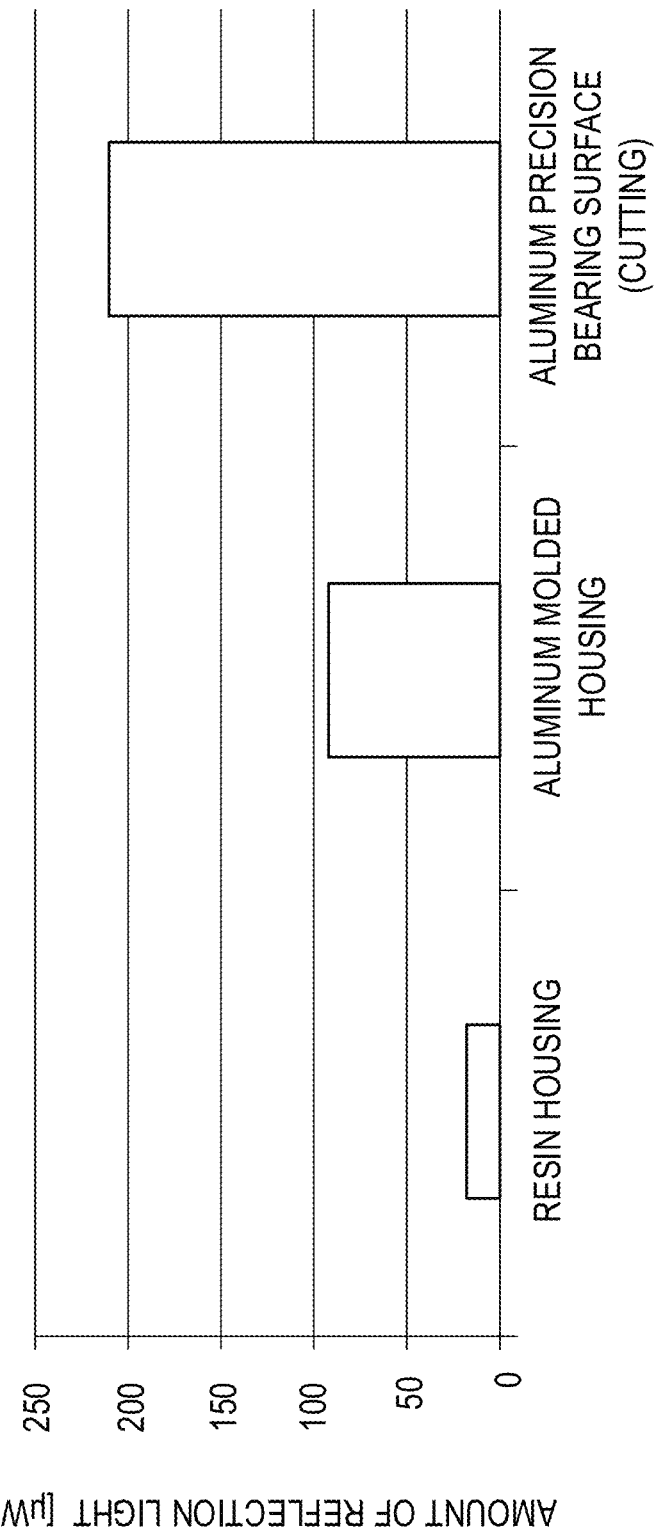
FIG. 3 is an explanatory graph for showing a difference in amount of reflection light in the embodiment.

FIG. 3 is a graph for showing the measurement results. In FIG. 3, the horizontal axis represents the optical box 105 made of the resin material (resin housing in FIG. 3), the optical box using aluminum as the metal material (aluminum molded housing in FIG. 3), and a bearing surface of the aluminum molded optical box 105 having been subjected to cutting (aluminum precision bearing surface (cutting) in FIG. 3), which are measured objects. In FIG. 3, the vertical axis represents the amount of reflection light (µW) given when the measured object is irradiated with the red laser beam having a predetermined amount of light. As shown in FIG. 3, when the amount of light reflected on the surface of the resin housing molded with the resin material is 19 µW, the amount of light reflected at the metal housing molded part made of aluminum is 93 µW that is approximately five times larger, and the amount of light reflected at the cut part of the metal housing is 210 µW that is approximately ten times larger than the case of the resin housing. From the facts described above, it can be seen that the measure against the stray light is important for the optical box 105 molded with the metal material.

Next, with reference to FIG. 4 and FIG. 5 for illustrating cross sections of the light scanning apparatus 40, detailed description is made of a state in which the photosensitive drums 50 are irradiated with the light beams emitted from the light source units 61. FIG. 4 is a sectional view for illustrating a cross section of the light scanning apparatus 40, and is an illustration of a part extending from the light source unit 61 to the rotary polygon mirror 42 of the deflector 43. In FIG. 4, the light source unit 61 includes a semiconductor laser (not shown), a laser board 64, and a collimator lens 68. The light beam (laser beam L) having been emitted from the semiconductor laser is collimated by the collimator lens 68 and exits from the light source unit 61. The light beam L having exited from the light source unit 61 proceeds to the incident optical system supporting base 83, and then is condensed onto the rotary polygon mirror 42 by the cylindrical lens 65, which is provided on the incident optical system supporting base 83 and has refractive power only in the sub-scanning direction being a rotation direction of the photosensitive drum 50.

FIG. 5 is a sectional view of the light scanning apparatus 40, and is an illustration of a state in which the laser beams having been deflected on the rotary polygon mirror 42 are guided to the photosensitive drums 50. The light scanning apparatus 40 includes the deflector 43. The deflector 43 includes the rotary polygon mirror 42 and a motor unit 41. The rotary polygon mirror 42 is configured to rotate at high speed to deflect each of light beams of four optical paths so that the light beams scan along the rotation axis direction (Y-axis direction) of the photosensitive drums 50. The motor unit 41 is configured to rotate the rotary polygon mirror 42. The deflector 43 includes the rotary polygon mirror 42, a motor, the motor unit 41, and a board (not shown). The motor is configured to rotate the rotary polygon mirror 42. The motor unit 41 is a drive unit configured to drive the motor. The board has the motor and the motor unit 41 mounted thereto. The light beams having been deflected by the rotary polygon mirror 42 of the deflector 43 pass through the optical lenses 63 and are guided by the reflection mirrors 62 to the photosensitive drums 50 being the surfaces to be scanned, thereby forming images on the photosensitive drums 50.

A light beam LY, which has been emitted from the light source unit 61 to correspond to the photosensitive drum 50Y, is deflected by the rotary polygon mirror 42 and enters the optical lens 63a. The light beam LY having passed through the optical lens 63a enters the optical lens 63b, and is reflected by the reflection mirror 62a after passing through the optical lens 63b. The light beam LY reflected by the reflection mirror 62a passes through a transparent window 69Y, and scans the photosensitive drum 50Y.

A laser beam LM, which has been emitted from the light source unit 61 to correspond to the photosensitive drum 50M, is deflected by the rotary polygon mirror 42 and enters the optical lens 63a. The laser beam LM having passed through the optical lens 63a is reflected by the reflection mirror 62b and the reflection mirror 62c, and enters the optical lens 63e. After passing through the optical lens 63e, the laser beam LM is reflected by the reflection mirror 62d. The laser beam LM reflected by the reflection mirror 62d passes through a transparent window 69M, and scans the photosensitive drum 50M.

A laser beam LC, which has been emitted from the light source unit 61 to correspond to the photosensitive drum 50C, is deflected by the rotary polygon mirror 42, and enters the optical lens 63c. The laser beam LC having passed through the optical lens 63c is reflected by the reflection mirror 62e and the reflection mirror 62f, and enters the optical lens 63f. The laser beam LC having passed through the optical lens 63f is reflected by the reflection mirror 62g. The laser beam LC reflected by the reflection mirror 62g passes through a transparent window 69C, and scans the photosensitive drum 50C.

A light beam LBk, which has been emitted from the light source unit 61 to correspond to the photosensitive drum 50Bk, is deflected by the rotary polygon mirror 42 and enters the optical lens 63c. The light beam LBk having passed through the optical lens 63c enters the optical lens 63d. After passing through the optical lens 63d, the light beam LBk is reflected by the reflection mirror 62h. The light beam LBk reflected by the reflection mirror 62h passes through a transparent window 69Bk, and scans the photosensitive drum 50Bk.

In FIG. 4, the light source unit 61 is assembled while being adjusted during manufacture of the light scanning apparatus 40. Thus, it is difficult to construct a tightly closed configuration of the optical box 105. Therefore, for dustproofing, there is provided an elastic member 66 (second dust-proof member) (see FIG. 4) serving as a dust-proof member configured to seal and tightly close a boundary portion between the incident optical system supporting base 83 and the cylindrical lens 65. Further, for dustproofing, there is provided an elastic member 84 (first dust-proof member) (see FIG. 4) serving as a dust-proof member configured to seal and tightly close a boundary portion between the incident optical system supporting base 83 and the optical box 105. The elastic member 84 is a seal member (dust-proof seal) which is formed of, for example, a sponge being a foaming member or a hotmelt not being a foaming member. When the incident optical system supporting base 83 is to be installed to the optical box 105, the elastic members 66 and 84 are brought into abutment against the cylindrical lens 65 and the optical box 105, respectively, and are then pressed to be squeezed, thereby sealing the boundary portions. With this, entry of contaminated air from the outside into the optical box 105 is prevented, thereby securing the tight closing of the optical box 105. In this embodiment, illustration is given of the configuration in which the elastic member 84 is arranged on the incident optical system supporting base 83 before being mounted to the optical box 105. However, the elastic member 84 may be arranged around the opening of the side wall of the optical box 105 before being mounted to the incident optical system supporting base 83.

[Configuration of Incident Optical System Supporting Base]

Figure 6:
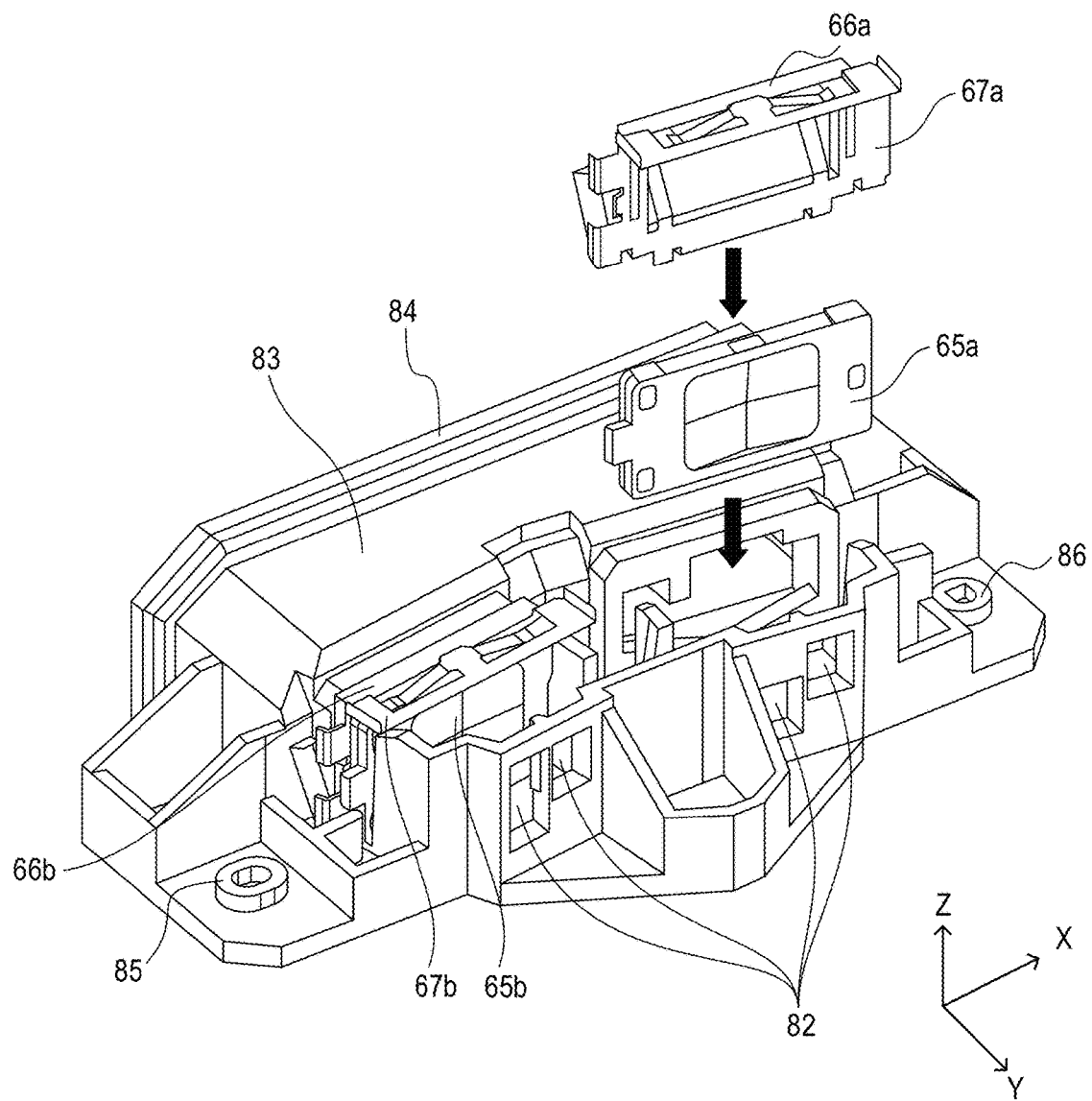
FIG. 6 is a perspective view for illustrating a configuration of an incident optical system supporting base in the embodiment.

Now, description is made of the incident optical system supporting base 83 in this embodiment. FIG. 6 is a perspective view for illustrating a configuration of the incident optical system supporting base 83 in this embodiment. The incident optical system supporting base 83 includes the elastic member 84 and a mounting bearing surface on which cylindrical lenses 65a and 65b are installed, and has positioning holes 85 and 86. A supporting portion on which the cylindrical lenses 65a and 65b are installed is herein referred to as the mounting bearing surface. However, the supporting portion is not limited to the (bearing) surface, and may be a point or a line. Further, the incident optical system supporting base 83 includes apertures 82. The apertures 82 are aperture portions which are configured to block part of the laser beams having passed through the cylindrical lenses 65a and 65b to thereby adjust respective spot shapes of the laser beams that expose the photosensitive drums 50. Moreover, in order to block the laser beams so that the laser beams emitted from the light source units 61 are prevented from entering the inner side of the optical box 105 due to reflection, the incident optical system supporting base 83 has a cylindrical shape surrounded by a light blocking wall in a region between the light source unit 61 side and the side on which the cylindrical lenses 65 are installed.

As described above, the elastic member 84 is brought into abutment against the optical box 105 on the side of the incident optical system supporting base 83 on which the light source units 61 are installed (light source side) to thereby tightly close the inside of the optical box 105. The cylindrical lens 65a allows the laser beams that irradiate the photosensitive drums 50C and 50Bk of the image forming engines 10C and 10Bk to pass therethrough. Meanwhile, the cylindrical lens 65b allows the laser beams that irradiate the photosensitive drums 50Y and 50M of the image forming engines 10Y and 10M to pass therethrough. As illustrated in FIG. 6, after the cylindrical lens 65a is installed on the mounting bearing surface of the incident optical system supporting base 83 from the upper side, a pressing spring 67a being a fixing member configured to urge the cylindrical lens 65a is assembled to the cylindrical lens 65a from the upper side. The pressing spring 67a includes a pressing spring provided at an upper portion and configured to urge the cylindrical lens 65a downward, pressing springs provided at side portions and configured to urge the cylindrical lens 65a toward the aperture 82 side, and an elastic member 66a configured to tightly close a boundary portion defined between the incident optical system supporting base 83 and the cylindrical lens 65a. The cylindrical lens 65a is fixed to the incident optical system supporting base 83 by the pressing spring 67a. A pressing spring 67b has the same configuration as the pressing spring 67a. In FIG. 6, illustration is given of a state in which the cylindrical lens 65b is fixed to the incident optical system supporting base 83 by the pressing spring 67b. The positioning holes 85 and 86 are fitted to positioning bosses described later, which are provided on the bottom surface of the optical box 105, to thereby fix the incident optical system supporting base 83 to the optical box 105.

Figure 7:
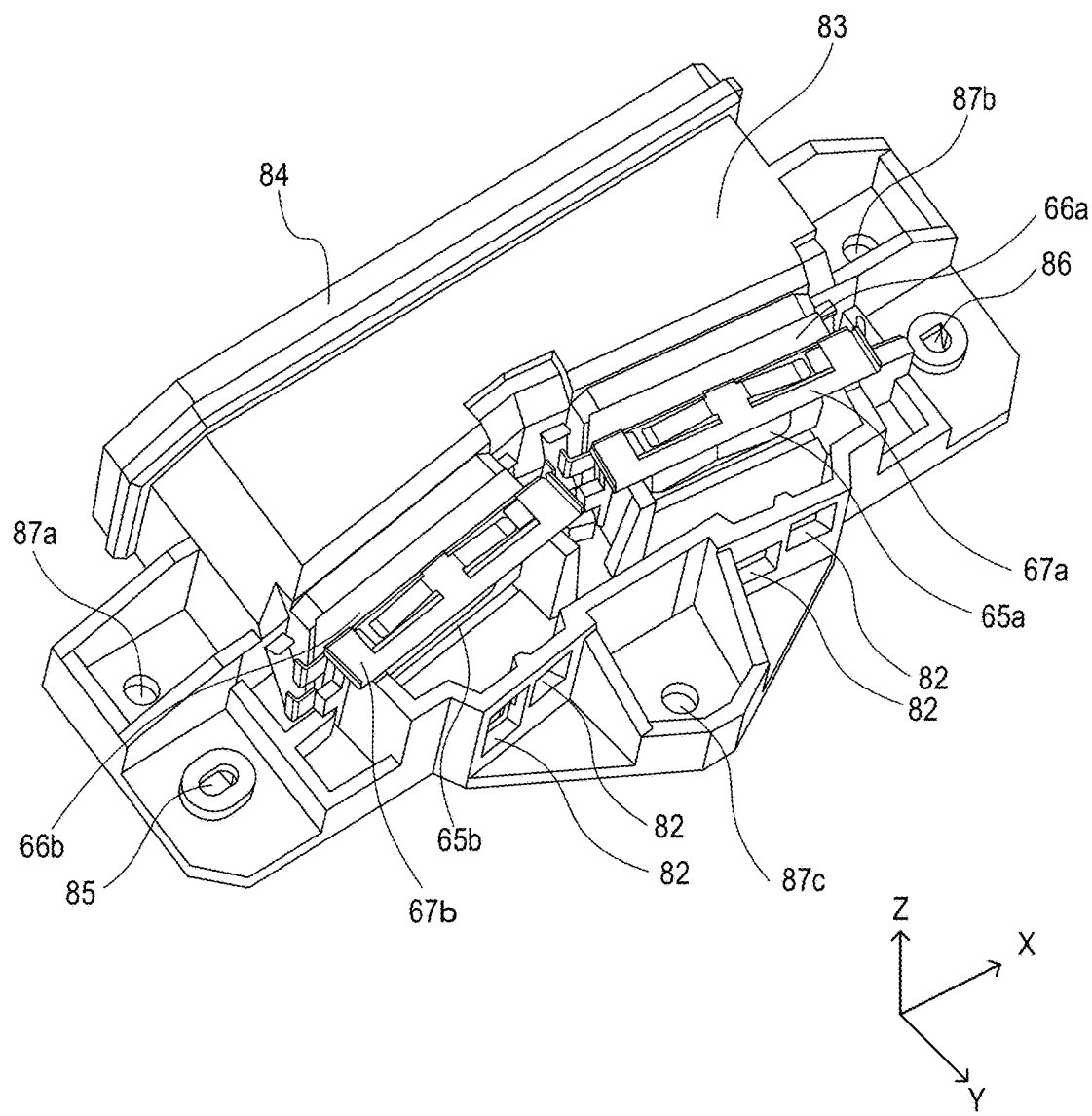
FIG. 7 is a perspective view for illustrating the configuration of the incident optical system supporting base in the embodiment.

FIG. 7 is an explanatory perspective view for illustrating a configuration for mounting the incident optical system supporting base 83 to the optical box 105. In FIG. 7, illustration is given of a state in which the cylindrical lenses 65a and 65b are installed on the mounting bearing surface of the incident optical system supporting base 83 and are fixed to the incident optical system supporting base 83 by the pressing springs 67a and 67b. Moreover, the cylindrical lens 65a and 65b and the incident optical system supporting base 83 are sealed through intermediation of the elastic members 66a and 66b provided to the pressing springs 67a and 67b. The incident optical system supporting base 83 includes the positioning holes 85 and 86. The positioning holes 85 and 86 are fitted to positioning bosses 107b and 107a (see FIG. 10) described later, which are provided upright on the bottom of the optical box 105, so that a position of the incident optical system supporting base 83 with respect to the optical box 105 is determined. Further, the incident optical system supporting base 83 has fixing holes 87a, 87b, and 87c for fixing the incident optical system supporting base 83 to the optical box 105. Moreover, in order to prevent deformation of the incident optical system supporting base 83 due to a thrust force applied at the time of fixing with screws, the optical box 105 has mounting bearing surfaces 106a to 106c (see FIG. 10) for receiving the fixing holes 87a to 87c which are to be brought into abutment thereagainst. The fixing holes 87a to 87c are matched with the mounting bearing surfaces 106a to 106c formed on the optical box 105, and are fixed with screws. With this, the incident optical system supporting base 83 is fixed to the optical box 105. The mounting bearing surfaces 106a to 106c and bearing surfaces which are provided on the back side of the fixing holes 87a to 87c and opposed to the mounting bearing surfaces 106a to 106c are precision bearing surfaces each having a level difference of merely several tens micrometers in the up-and-down direction so that the incident optical system supporting base 83 is prevented from being inclined at the time of fixing with the screws.

Figure 8:
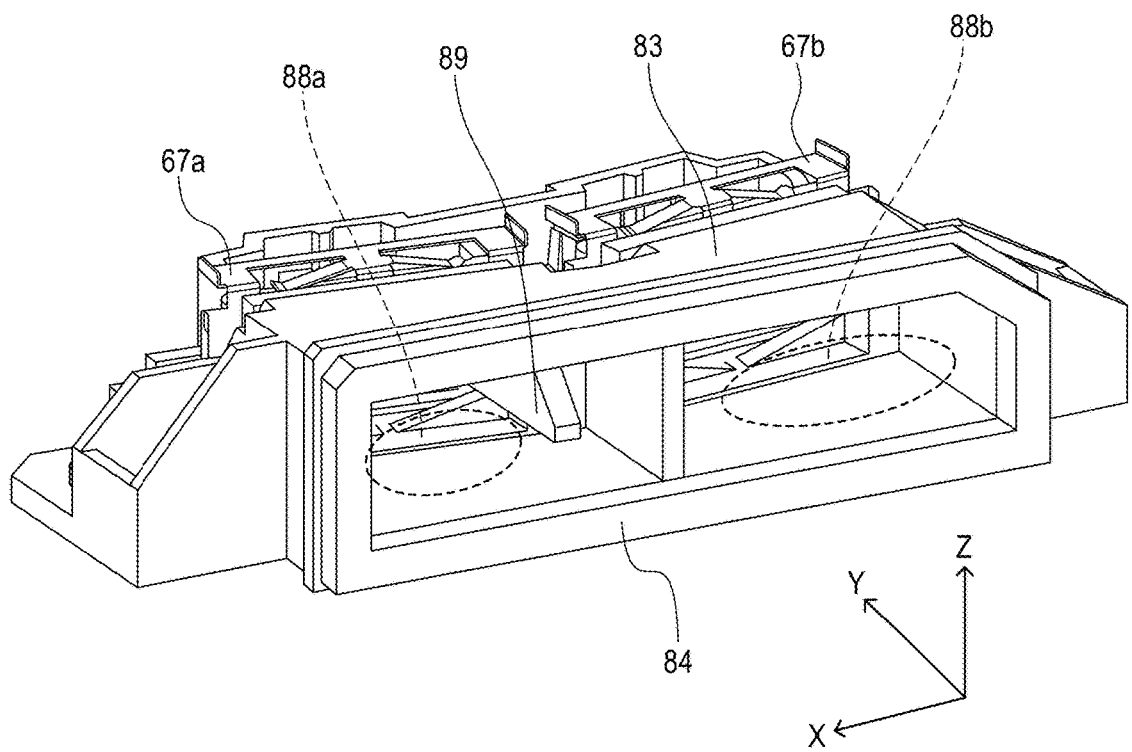
FIG. 8 is a perspective view for illustrating the configuration of the incident optical system supporting base in the embodiment.

FIG. 8 is a perspective view of the incident optical system supporting base 83 as seen from the light source unit 61 side. The incident optical system supporting base 83 includes the elastic member 84, which is provided on the light source unit 61 side and is brought into abutment against the optical box 105 to seal the boundary portion with respect to the optical box 105. Moreover, the incident optical system supporting base 83 includes the light blocking wall having a cylindrical shape between the elastic member 84 and the pressing springs 67a and 67b configured to press the cylindrical lenses 65. As illustrated in FIG. 8, the inside of the light blocking wall having a cylindrical shape has a tunnel-like shape, and a partition wall is provided at a center thereof so that the inside of the light blocking wall is divided into two laser beam passage portions 88a and 88b for allowing the laser beams emitted from the light source units 61 to pass therethrough. The laser beam passage portion 88a allows the laser beams, which are emitted from the light source unit 61 and pass through the cylindrical lens 65a to irradiate the photosensitive drums 50C and 50Bk of the image forming engines 10C and 10Bk, to pass therethrough. Meanwhile, the laser beam passage portion 88b allows the laser beams, which are emitted from the light source unit 61 and pass through the cylindrical lens 65b to irradiate the photosensitive drums 50Y and 50M of the image forming engines 10Y and 10M, to pass therethrough.

The elastic member 84 has a substantially rectangular shape extending along the shape of the end portion of the incident optical system supporting base 83 on the light source unit 61 side, and is sandwiched between the optical box 105 and the incident optical system supporting base 83, thereby securing the dust-proof performance for the inside of the optical box 105. Moreover, on the laser beam passage portion 88a side, there is provided a protrusion 89 for allowing smooth installation of the incident optical system supporting base 83 to the optical box 105. Details of the protrusion 89 are described later.

Figure 9A:
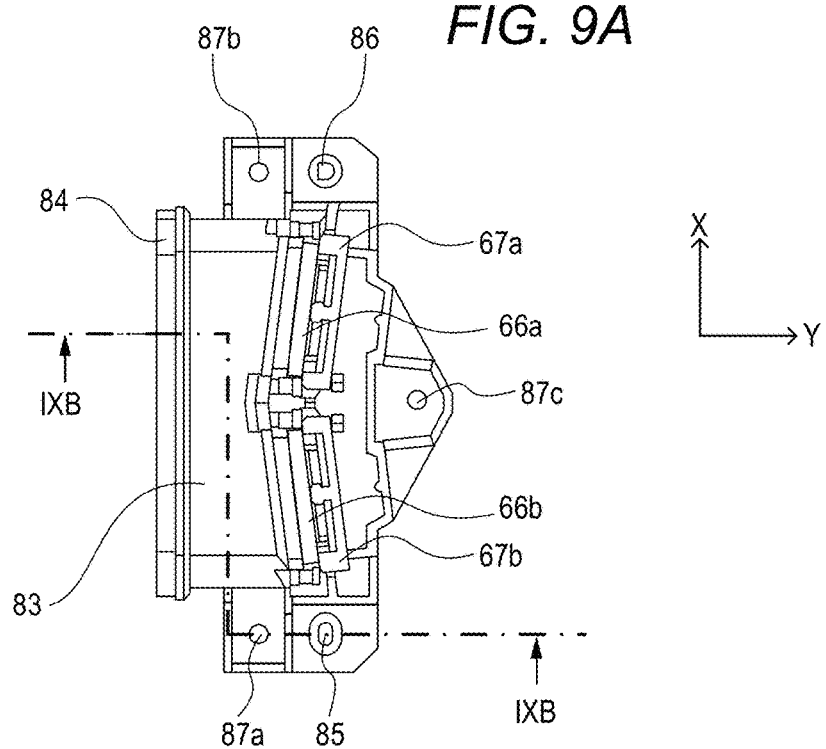
FIG. 9A is a plan view of the incident optical system supporting base in the embodiment.
Figure 9B:
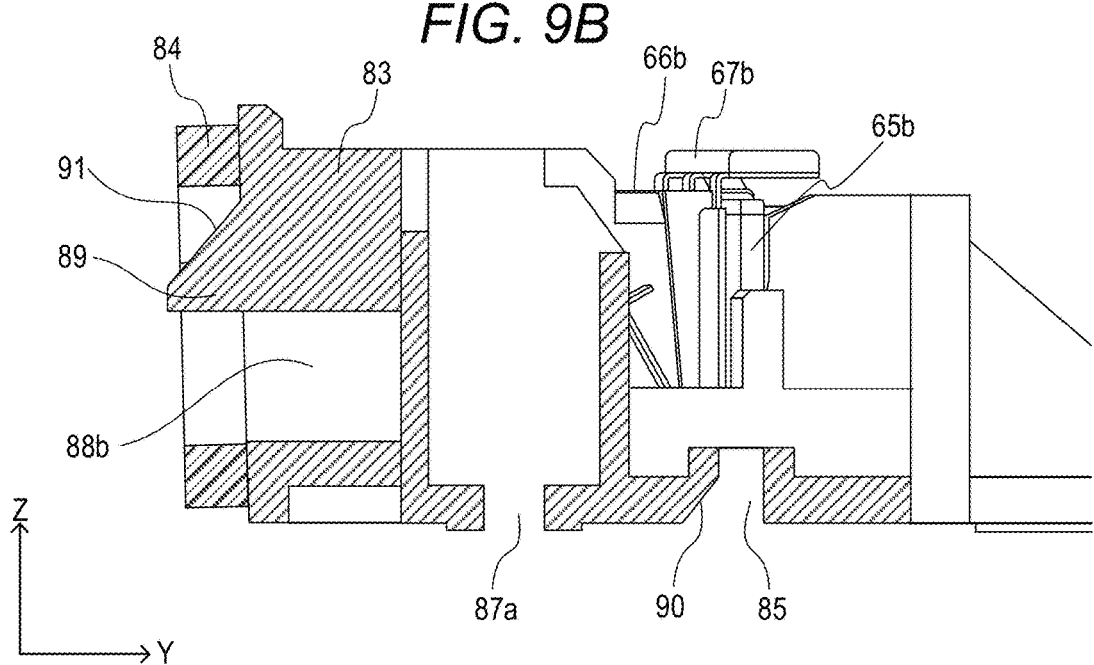
FIG. 9B is a sectional view of the incident optical system supporting base in the embodiment.

FIG. 9A and FIG. 9B are explanatory views for illustrating a characteristic configuration for securing the dust-proof performance at the time of installing the incident optical system supporting base 83 to the optical box 105. FIG. 9A is a plan view of the incident optical system supporting base 83 as seen from the upper side. As illustrated in FIG. 9A, the incident optical system supporting base 83 has the two positioning holes 85 and 86 and the fixing holes 87a, 87b, and 87c. Moreover, the cylindrical lenses 65a and 65b urged by the pressing springs 67a and 67b are installed in a state of being angled toward the rotary polygon mirror 42 so that the laser beams having passed through the cylindrical lenses 65a and 65b proceed to the rotary polygon mirror 42 of the deflector 43. Moreover, the elastic members 66a and 66b are provided so as to seal portions (boundaries) between the pressing springs 67a and 67b and the incident optical system supporting base 83, and the elastic member 84 is provided so as to seal a portion (boundary) between the incident optical system supporting base 83 and the optical box 105 and secure the dust-proof performance.

FIG. 9B is a sectional view of the incident optical system supporting base 83 taken along the cross section IXB-IXB illustrated in FIG. 9A (indicated by the one-dot chain line in FIG. 9A), and is an illustration of the cross section as seen upward from the lower side in FIG. 9A. As illustrated in FIG. 9B, the protrusion 89 includes an inclined surface portion 91 being an inclined surface inclined toward the light source unit 61 (leftward in FIG. 9B), and a tip portion of the protrusion 89 in the direction toward the light source unit 61 protrudes toward the light source unit 61 side with respect to the elastic member 84. The inclined surface portion 91 is formed so that a height thereof in the Z-axis direction increases in a direction of separating from the light source unit 61. The fixing hole 87a is a hole for fixing the incident optical system supporting base 83 to the optical box 105 with a screw. Moreover, the positioning hole 85 is a hole to be fitted to the positioning boss 107b (see FIG. 10) of the optical box 105, and an inclined surface 90 inclined in the direction toward the light source unit 61 (direction toward the light source) is formed therein. The inclined surface 90 is formed so that a height thereof in the Z-direction increases in the direction of separating from the light source unit 61. Moreover, it can be seen that the cylindrical lens 65b is urged toward the deflector 43 by the pressing spring of the pressing spring 67b illustrated in FIG. 9B.

Figure 10:
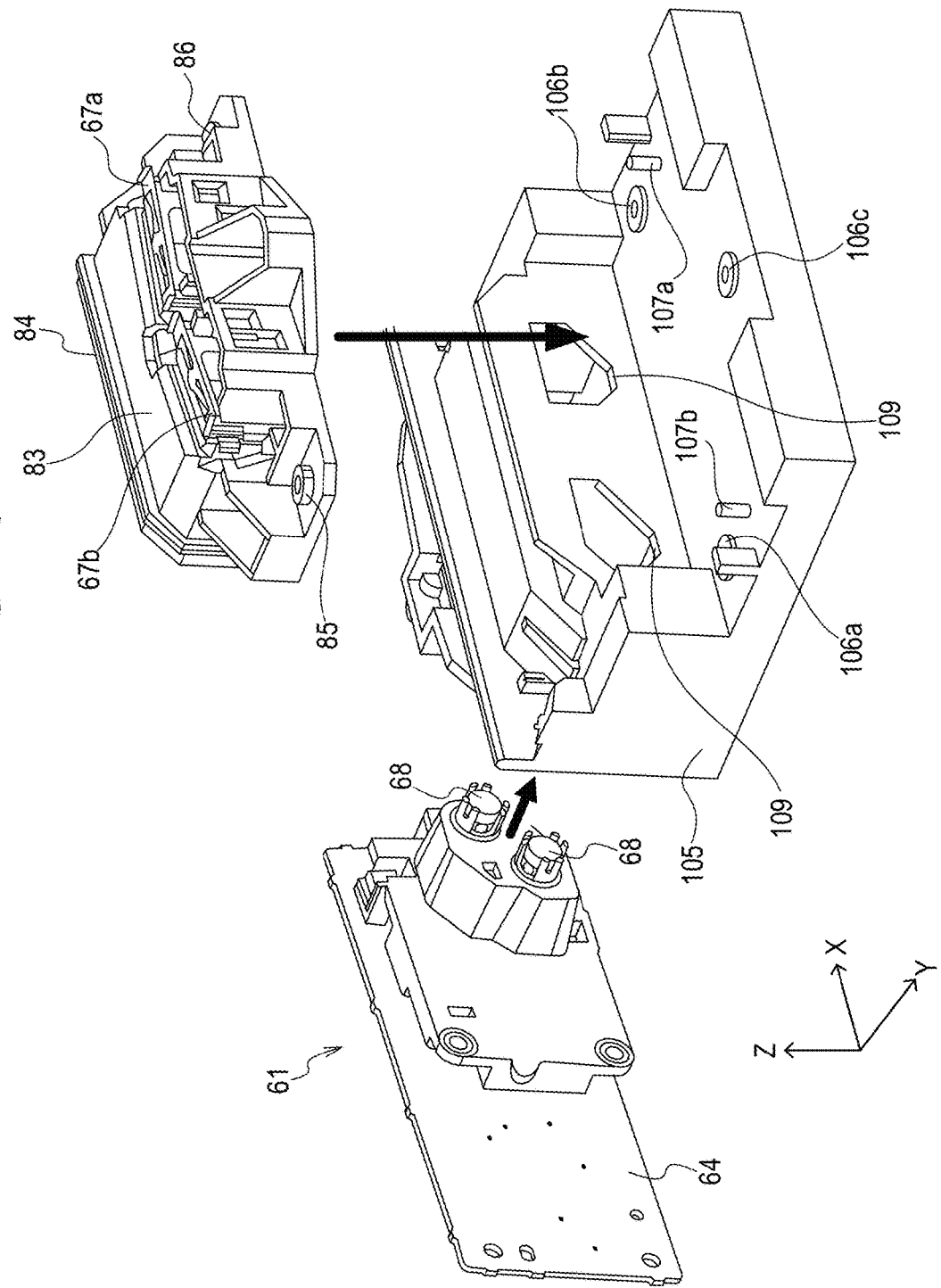
FIG. 10 is an explanatory view for illustrating a method of mounting the incident optical system supporting base and a light source unit to an optical box in the embodiment.

FIG. 10 is an explanatory perspective view for illustrating a state of mounting the incident optical system supporting base 83 and the light source unit 61 to the optical box 105. In FIG. 10, illustration of the optical box 105 is simplified through illustration of only a portion of the actual optical box 105 to which the incident optical system supporting base 83 and the light source unit 61 are mounted. On the bottom surface of the optical box 105, there are provided the positioning bosses 107b and 107a at positions opposed to the positioning holes 85 and 86 of the incident optical system supporting base 83. Through fitting of the positioning holes 85 and 86 to the positioning bosses 107b and 107a, the position of the incident optical system supporting base 83 with respect to the optical box 105 is determined. Moreover, on the bottom surface of the optical box 105, the mounting bearing surfaces 106a, 106b, and 106c having screw holes for the screws are formed at positions opposed to the fixing holes 87a, 87b, and 87c, which are described above and illustrated in FIG. 7. The mounting bearing surfaces are formed on the surfaces around the fixing holes 87a to 87c opposed to the mounting bearing surfaces 106a to 106c, and are precision bearing surfaces similar to the mounting bearing surfaces 106a to 106c. The fixing holes 87a to 87c are matched with the mounting bearing surfaces 106a to 106c formed on the optical box 105 and thereafter are fixed by screws, thereby fixing the incident optical system supporting base 83 to the optical box 105.

Moreover, the light source unit 61 has a configuration in which the collimator lenses 68 are mounted to the laser board 64. Through fitting of a positioning boss (not shown) provided on a side surface of the optical box 105 to a positioning hole (not shown) of the light source unit 61, a position of the light source unit 61 is determined. Further, through fixing to the optical box 105 by screws (not shown), the light source unit 61 is fixed to the optical box 105. In FIG. 7, the laser beams emitted from the light source unit 61 pass through the laser beam passage portion 88b and the cylindrical lens 65b inside the incident optical system supporting base 83, are deflected by the rotary polygon mirror 42, and irradiate the photosensitive drums 50Y and 50M of the image forming engines 10Y and 10M.

[Mounting of Incident Optical System Supporting Base to Optical Box]

Figure 11A:
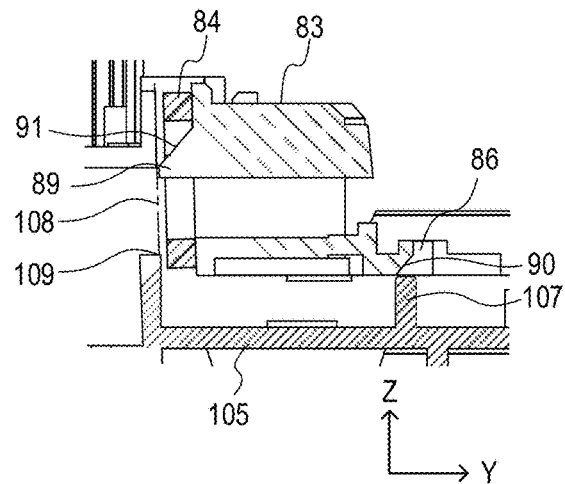
FIG. 11A, FIG. 11B, FIG. 11C, and FIG. 11D are explanatory views for illustrating a procedure of mounting the incident optical system supporting base to the optical box in the embodiment.

FIG. 11A, FIG. 11B, FIG. 11C, and FIG. 11D are explanatory views for illustrating a state of mounting the incident optical system supporting base 83 to the optical box 105. In the following, with reference to FIG. 11A to FIG. 11D, description is made of a method of mounting the incident optical system supporting base 83 to the optical box 105. FIG. 11A is a view for illustrating an initial state of mounting the incident optical system supporting base 83 to the optical box 105. There is given a positional relationship with the light source unit 61 provided on the left side in FIG. 11A and the deflector 43 provided on the right side in FIG. 11A. The state illustrated in FIG. 11A corresponds to a state in which the tip portion of the positioning boss 107 provided on the bottom surface of the optical box 105 starts being engaged with the inclined surface 90 being the inclined surface of the positioning hole 86. In FIG. 11A, the tip of the protrusion 89 on the light source unit 61 side is held in abutment against a boundary portion 108 of the optical box 105 with respect to the incident optical system supporting base 83. Thus, as illustrated in FIG. 11A, the incident optical system supporting base 83 cannot be moved leftward in FIG. 11A. Moreover, in the state of FIG. 11A, the elastic member 84 is not held in contact with the boundary portion 108 of the optical box 105.

Figure 11B:
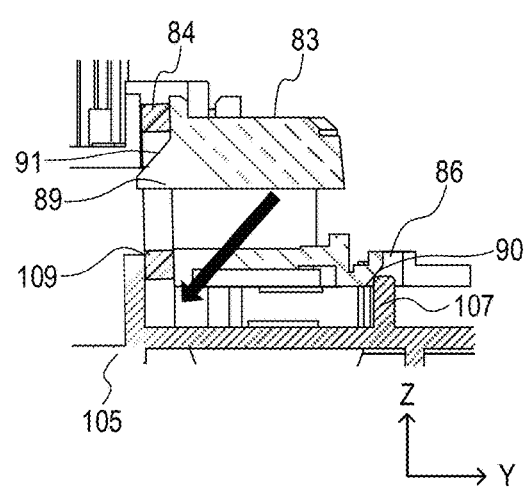

FIG. 11B is a view for illustrating a state in which the incident optical system supporting base 83 is pushed toward the lower left side in FIG. 11B from the state of FIG. 11A. The positioning boss 107 is guided by the inclined surface 90 so that the incident optical system supporting base 83 slides toward the lower left side in FIG. 11B. Moreover, the protrusion 89 includes the inclined surface portion 91. Thus, the protrusion 89 can slide without interference with the boundary portion 108. Further, in the state illustrated in FIG. 11B, the elastic member 84 starts being brought into contact with the boundary portion 108. As the incident optical system supporting base 83 is caused to further slide toward the lower left side in FIG. 11B, the elastic member 84 is pressed by the incident optical system supporting base 83 toward the boundary portion 108 and starts being gradually squeezed.

Figure 11C:
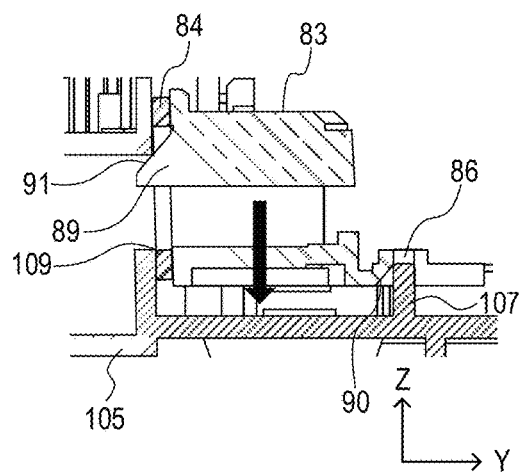

FIG. 11C is an illustration of a state in which the positioning boss 107 is located at a position of having passed beyond the inclined surface 90 as a result of sliding of the incident optical system supporting base 83 toward the lower left side in FIG. 11C from the state of FIG. 11B. The positioning boss 107 is located at the position of having passed beyond the inclined surface 90. Thus, the incident optical system supporting base 83 cannot further slide toward the lower left side in FIG. 11C but can slide only downward in FIG. 11C. As illustrated in FIG. 11C, the elastic member 84 is in a state of being pressed toward the boundary portion 108 side (toward boundary portion 103) and thereby squeezed as a result of sliding of the incident optical system supporting base 83 toward the lower left side in FIG. 11C from the state of FIG. 11B. As a result, the portion (boundary) between the incident optical system supporting base 83 and the optical box 105 is sealed by the elastic member 84 so that the inside of the optical box 105 is tightly closed.

Figure 11D:
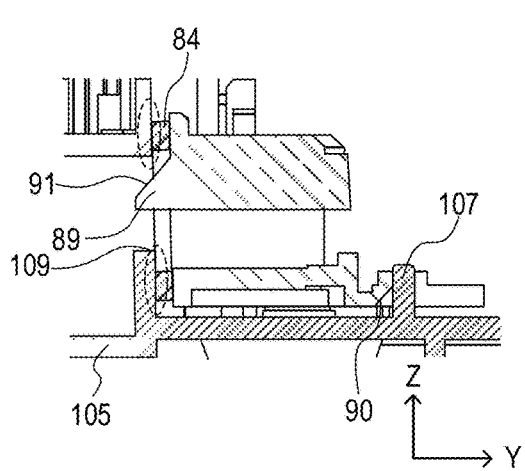

FIG. 11D is a view for illustrating a state in which the tip portion of the positioning boss 107 has passed through the positioning hole 86 and has been fitted thereto after causing the incident optical system supporting base 83 to slide downward in FIG. 11D from the state of FIG. 11C. The state illustrated in FIG. 11D corresponds to a state in which the incident optical system supporting base 83 is installed to the optical box 105. In this state, the elastic member 84 is squeezed as indicated by the broken-line portions, thereby being capable of securing tight closing of the incident optical system supporting base 83 and the optical box 105.

When the incident optical system supporting base 83 does not include the inclined surface 90 and the protrusion 89 including the inclined surface portion 91, the incident optical system supporting base 83 cannot be mounted to the optical box 105 by the steps illustrated in FIG. 11A to FIG. 11D. When the positioning hole 86 does not include the inclined surface 90, and the incident optical system supporting base 83 is assembled downward in FIG. 11A from the upper side with the positioning boss 107 and the positioning hole 86 being engaged with each other from the beginning, the elastic member 84 rides over an edge portion 109 of FIG. 11A and is flipped over. The edge portion 109 is a lower side portion of the opening at the boundary between the optical box 105 and the incident optical system supporting base 83 illustrated in FIG. 10. As a result, it becomes more difficult to secure the tight closing of the optical box 105. In this embodiment, the incident optical system supporting base 83 includes the protrusion 89 and the inclined surface 90 of the positioning hole 86. With this configuration, at the time of mounting the incident optical system supporting base 83 to the optical box 105 described above, an operator who performs assembly cannot perform such a mounting operation that causes removal or flipping of the elastic member 84. As a result, the incident optical system supporting base 83 can be mounted while preventing the elastic member 84 from being flipped over due to contact with the optical box 105, thereby being capable of securing the stable dust-proof performance.

In this embodiment, illustration is given of the configuration in which the protrusion 89 is provided to the incident optical system supporting base 83, but the embodiment is not limited to this configuration. For example, the same effect can be attained also with a configuration in which the protrusion is provided on the optical box 105 side and in which the protrusion is caused to enter the opening on the incident optical system supporting base 83 side.

As described above, according to this embodiment, dust-proofing for the optical box can be performed with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-020697, filed Feb. 8, 2018, which is hereby incorporated by reference herein in its entirety.

What is claimed is:

1. A light scanning apparatus comprising:
a light source configured to emit a light beam;
a rotary polygon mirror configured to deflect the light beam emitted from the light source;

an optical component of an incident optical system configured to introduce the light beam, which has been emitted from the light source, to the rotary polygon mirror;

an optical box, to which the light source is mounted, configured to contain the rotary polygon mirror and the optical component in an inside of the optical box; and a supporting base, which is installed on an optical path of the light beam between the light source and the rotary polygon mirror, and is configured to support the optical component, wherein the supporting base includes:

a first dust-proof member configured to seal a boundary portion between the optical box and the supporting base to dustproof the inside of the optical box; and a protrusion configured to enter an opening, which is formed in a side wall of the optical box from the inside of the optical box in a state in which the supporting base is mounted to the optical box, the light source being fixed to the opening.

2. The light scanning apparatus according to claim 1, wherein a tip of the protrusion protrudes toward the light source more than the first dust-proof member.

3. The light scanning apparatus according to claim 2, wherein the supporting base has a positioning hole for determining a position at which the supporting base is installed to the optical box, and wherein the positioning hole and the protrusion each have an inclined surface which gets higher in a direction away from the light source.

4. The light scanning apparatus according to claim 3, wherein the optical box includes a boss, which is provided upright on a bottom of the optical box and is to be used for positioning of the supporting base, and wherein positioning of the supporting base with respect to the optical box is performed by fitting of the boss for positioning into the positioning hole of the supporting base.

5. The light scanning apparatus according to claim 4, wherein the inclined surface of the protrusion is prevented from being brought into contact with the optical box when a tip of the boss for positioning moves along the inclined surface of the positioning hole.

6. The light scanning apparatus according to claim 5, wherein the first dust-proof member is provided on a side of the light source of the supporting base, and is squeezed by the supporting base and the optical box when the supporting base is mounted to the optical box at a predetermined position.

7. The light scanning apparatus according to claim 6, wherein the optical box includes a bearing surface, which is provided upright on the bottom of the optical box and is to be used for fixing the supporting base, and wherein the supporting base has a hole for fixing the supporting base to the optical box at a position of being brought into abutment against the bearing surface for fixing the supporting base when the boss for positioning is fitted into the positioning hole of the supporting base.

8. The light scanning apparatus according to claim 1, wherein the supporting base includes:

a mounting bearing surface for mounting the optical component; and a light blocking wall having a cylindrical shape, which is provided between the first dust-proof member and the mounting bearing surface, and is configured to block the light beam, and wherein the light beam emitted from the light source passes an inside of the light blocking wall.

9. The light scanning apparatus according to claim 8, wherein the optical component installed to the mounting bearing surface is fixed by a fixing member configured to fix the optical component.

10. The light scanning apparatus according to claim 9, wherein the fixing member includes a second dust-proof member configured to seal a boundary between the supporting base and the optical component.

11. The light scanning apparatus according to claim 9, wherein the optical component comprises a cylindrical lens having refractive power only in a predetermined direction.

12. The light scanning apparatus according to claim 11, further comprising an optical component of an exit optical system configured to introduce the light beam deflected by the rotary polygon mirror to a member to be scanned, wherein a mounting bearing surface configured to support the optical component of the exit optical system is formed integrally with the optical box.

13. The light scanning apparatus according to claim 12, wherein the supporting base includes an aperture portion configured to shape a spot shape of a light beam for exposing the member to be scanned by blocking a part of the light beam having passed through the cylindrical lens.

14. An image forming apparatus comprising:

an image forming unit configured to form an image on a sheet;

a light scanning apparatus including:

a light source configured to emit a light beam;

a rotary polygon mirror configured to deflect the light beam emitted from the light source;

an optical component of an incident optical system configured to introduce the light beam, which has been emitted from the light source, to the rotary polygon mirror;

an optical box, to which the light source is mounted, configured to contain the rotary polygon mirror and the optical component in an inside of the optical box; and a supporting base, which is installed on an optical path of the light beam between the light source and the rotary polygon mirror, and is configured to support the optical component, wherein the supporting base includes:

a first dust-proof member configured to seal a boundary portion between the optical box and the supporting base to dustproof the inside of the optical box; and a protrusion configured to enter an opening, which is formed in a side wall of the optical box from the inside of the optical box in a state in which the supporting base is mounted to the optical box, the light source being fixed to the opening.

* * * * *